United States Patent Office 3,317,372
Patented May 2, 1967

3,317,372
HOUSEHOLD DEODORANT
Una L. Hart, St. Paul, Minn.
No Drawing. Filed Sept. 29, 1965, Ser. No. 491,374
13 Claims. (Cl. 167—14)

This application is a continuation-in-part of Ser. No. 223,521 filed Sept. 13, 1962, now abandoned.

This invention relates to an improvement in household deodorant and deals particularly with a product effective in deodorizing vomitus.

Various types of deodorizers have been produced for use about the home designed to deodorize or mask offensive odors. Many such products include a perfume or scent which has a tendency to hide or mask the odor. Products of this type do not actually destroy the origin of the odor and do not destroy the odor itself, but merely tend to overpower it with a stronger scent. Other products which have been commonly used include an ingredient such as chloroform which has a tendency to paralyze the sense organs to the extent where the odors cannot be smelled. Such a product may be used for temporary odors, but are not effective unless the source of the odor is removed.

One of the common odors which is extremely offensive is that of vomitus. This odor is rather commonplace, particularly in homes containing small children. In this case, the odor remains until the vomitus is disposed of, which is usually a most disagreeable task. An object of the present invention resides in the provision of a product capable of deodorizing the vomitus so that it can be disposed of without discomfort and displeasure, as well as to aid in its removal from surfaces and fabrics not damaged by water.

A feature of the present invention resides in the provision of a deodorant of the type described which includes a soluble base or one or more basic salts capable of converting low colecular weight odoriferous fatty acids to odorless salts. As a result, the product, through chemical action, transforms the vomitus to a relatively odorless material.

A further feature of the present invention resides in providing a deodorant of the type described which preferably includes a volatile base or mixture of bases which react with low molecular weight odoriferous fatty acids which are present in the air in gaseous form to convert them to odorless salts. As a result, not only the odoriferous product but the gases which have evolved therefrom, are effectively deodorized by chemical action.

A further feature of the invention resides in the provision of a deodorant of the type described which preferably employs a wetting agent. The purpose of the wetting agent is to increase the penetrating power of the deodorizing solution and to thus more rapidly react with the odoriferous acids which may be absorbed in or adsorbed on solid food particles or mucin, a protein normally found in gastric juice. The wetting agent also aids in the removal of vomitus from rugs, upholstery and other fabrics or surfaces not injured by water, and helps to prevent the staining of these surfaces.

A further feature of the present invention resides in the provision of a deodorant of the type described, which in its preferred form, includes a soluble form of a bactericidal agent. The purpose of this agent is to prevent the growth of bacteria in the product on storage, and to prevent the formation of odoriferous products by bacterial action.

An added feature of the present invention resides in the provision of a deodorant of the type described, which in its preferred form includes a fungicidal agent. This as well as the bactericidal agent lends stability to the product, and also serves to prevent the formation of odoriferous products by fungi and molds. This material also acts to prevent the growth of micro-organisms in the product on storage.

These and other objects and novel features of the present invention will be more clearly and fully set forth in the following specification and claims.

The deodorant is particularly designed for use in the deodorization of vomitus. The chief odorants in this material are degradation products of fats, and particularly butterfat. These degradation products are the lower molecular weight fully acids, such as butyric acid, and they may be converted to odorless salts by the action of suitable bases.

Accordingly, the most essential ingredient of the deodorant is a soluble base or combination of bases. These bases are preferably milder than products such as sodium hydroxide or potassium hydroxide, although even the stronger bases may be used. The stronger bases are obviously caustic and have to be handled carefully, as they are injurious to skin and clothing. Basic salts such as sodium bicarbonate, potassium bicarbonate, sodium carbonate, di-sodium hydrogen phosphate, sodium acetate, sodium citrate, sodium tartrate, as well as the borates of sodium, calcium and potassium, have been effectively used. Slightly soluble bases such as calcium hydroxide and magnesium hydroxide have been found effective.

The following table lists the pH of the above mentioned substances:

| Basic Salt | pH | Authority |
|---|---|---|
| Sodium bicarbonate | 8.4 | (1) |
| Potassium bicarbonate | 8.5 | (E.D.) |
| Sodium carbonate | 11.6 | (1) |
| Di-sodium hydrogen phosphate | 8.2 | (4) (5) |
| Sodium acetate | 8.8 | (2) |
| Do | 9.0 | (3) |
| Sodium citrate | 9.7 | (C.V.) |
| Sodium tartrate | 8.7 | (C.V.) |
| Sodium borate | 9.2 | (1) |
| Do | 10.0 | (3) |
| Calcium borate | | (N.A.) |
| Potassium borate | | (N.A.) |
| Calcium hydroxide | 12.4 | (1) |
| Magnesium hydroxide | 10.5 | (1) |

All of the solutions are 0.1 normal with the following exceptions: calcium hydroxide and magnesium hydroxide are saturated solutions, and the concentration of sodium citrate was not listed. However, the calculated value for 0.1 N solution of sodium citrate is 9.7. The authorities for the table are as follows:

AUTHORITIES (1) Handbook of Chemistry and Physics, 45th Edition, The Chemical Rubber Co., Cleveland, Ohio, 1964–1965, page D–73.
(2) Qualitative Analysis and Chemical Equilibrium, by Hogness and Johnson, 3rd Edition, Henry Holt & Co., page 182.
(3) Textbook of Physical Chemistry, J. Newton Friend, J. P. Lippincott Co., Philadelphia, Pa. 1935, page 309.
(4) J. R. Williams and M. Swett, Proc. Soc. Expt. Biol. and Med. 19, 266–268.
(5) W. E. Ringer, Chem. Abs. 4, 5 (1910).
(C.V.) Calculated Value.
(E.D.) Experimentally determined (pH meter).
(N.A.) Not available. The pH value of these borates were not found in an extensive search of the St. Paul Hill Reference Library and the University of Minnesota Library. However, these borates are apparently about the same as calcium borate in pH, or about 9.2.

As noted, the pH range is between 8.2 and 12.4 from a saturated solution of a slightly soluble base to 35 percent by weight of a soluble base.

One purpose of the bases, as previously stated, is to convert the low molecular weight, odoriferous fatty acids to odorless salts. Thus, instead of providing a product which masks the odor or which dulls the senses, the odors are actually rendered odorless by action.

The second ingredient which is somewhat less essential than the soluble base or bases, but which is very important for quickly deodorizing the vomitus is a volatile base or bases such as ammonia, normally in the form of ammonium hydroxide, volatile amines, and quaternary ammonium hydroxides from which volatile basic products may be evolved. The purpose of this ingredient is to react with the low molecular weight odoriferous fatty acids which have passed into the air in gaseous form. This volatile base thus chemically combines with such gases to convert them to odorless salts.

A third ingredient which is not absolutely necessary, but which reduces the time required for the chemical reactions to take place is a wetting agent. This may be a material such as a silicone such as that commercially produced as Dow Corning Antifoam A, or which may be a cationic wetting agent such as alkylaryl sulfonates, alkyl sulfates, and alkyl phosphates. Antifoam A is a 30% aqueous emulsion of silicone (or a methyl polysiloxane). The wetting agent may also be an anionic wetting agent such as quaternary ammonium salts and non-ionic wetting agents such as esters of polymeric alcohols with fatty acids, monoesters of polyhydric alcohols, and esters of polymeric ether alcohols.

The purpose of the wetting agent is to increase the penetrating power of the deodorizing solution for the purpose of more rapidly reacting with odoriferous acids such as may be absorbed in or adsorbed on solid food particles or mucin, a protein normally found in gastric juice, and to aid in removal of vomitus from surfaces and fabrics not damaged by water.

The bactericidal agents which are preferably used in the deodorant may also vary somewhat in nature. Effective results have been produced with agents such as the soluble sulfa drugs such as the sodium salts of sulfadiazine, sulfamerazine, and sulfapyrazine. Mercurial compounds such as Metaphen, Merthiolate, Mercresin, and phenyl mercuric nitrate, are also effective as well as phenolic compounds such as thymol and resorcinol. Heavy metal salts such as zinc sulfate, quaternary ammonium salts such as benzalkonium chloride are also effective. Also useful for this purpose are hexachlorophene and alcohols such as ethyl alcohol and propylene glycol.

The bactericidal agents assist in preventing new odor formation, and increase the stability of the product itself. These agents act to prevent the formation of odoriferous products by bacteria action and also assist in preventing the growth of bacteria in the product in storage.

The product is also improved through the use of a fungicidal agent. As an example, this may be a product such as the sodium salts of acids such as sodium propionate, phenolic compounds such as resorcinol and beta-naphthol or a solution of organic derivatives of heavy metals such as phenyl mercuric nitrate. This product prevents the formation of odoriferous products by fungi and molds, and also acts to prevent the growth of these micro-organisms in the product itself on storage.

To the products described other materials of a more conventional nature may be added. For example, the product is preferably perfumed to give it an agreeable aroma, and coloring material may, if desired, be added to give the product a distinctive color. However, the ingredients of this type are entirely optional, and are not depended upon to produce the intended result. The proportions of the ingredients may also be varied without completely destroying the usefulness of the composition, the soluble base and the volatile base comprising the most essential ingredients.

The proportions of the various ingredients can be varied. However, in general they are kept within the general range as follows: The soluble base may be used in a concentration of up to a saturated solution of most bases, but should not exceed thirty-five percent by weight when the base is very soluble. The volatile base should be present within the range of about 0.01 percent to ten percent by weight. The bactericidal agent should be present in an amount up to about one percent by weight. The fungicidal agent should be present to a similar extent. The wetting agent should be present in the amount of up to two percent by weight.

As specific examples of the formula, I may use the following:

Example I 2 l. distilled or deionized water
200 g. potassium bicarbonate
5 ml. concentrated ammonium hydroxide
½–1 ml. Victawet 12 (Victor Chemical Works)
2 ml. of 17% Zephiran Chloride (Winthrop Laboratories)

Victawet 12 may be described by the formula $R_3PO_4$ in which 1 R, $R_1$ is a medium chain alkyl group and the other two R's, $R_2$ and $R_3$ are water solubilizing groups. Zephiran Chloride is a refined form of benzalkonium chloride.

As a second formula which has been proven very effective, I may use the following:

Example II 2 l. distilled or deionized water
180 g. disodium hydrogen phosphate (anhydrous)
½ ml. of Surfonic 120 (Jefferson Chemical Co.)
5 ml. concentrated ammonium hydroxide
2 g. of thymol dissolved in 5 ml. of 95% ethanol
2–3 drops of a 5% tincture of oil of lavender Surfonic 120 is a nonylphenoxypolyoxyethylene, an adduct of nonyl phenol with ethylene oxide in the molar ratio of 1 to 10.

As a third example of a formula which may be used, I cite the following:

Example III 2 l. distilled or deionized water
165 g. sodium acetate (anhydrous)
5 ml. concentrated ammonium hydroxide
½ ml. of Dow Corning Antifoam A All of the formulas described act to effectively deodorize the vomitus, and are very useful in preventing the staining of the surface or fabric to be cleaned, not only is the solution effective in cleaning the surface, but it is also effective in making the cleaning up operation pleasanter.

In accordance with the patent statutes, I have described my improvement in household deodorant, and while I have endeavored to set forth the best embodiment thereof, I desire to have it understood that changes may be made within the scope of the following claims without departing from the spirit of my invention.

I claim:
1. A deodorant composition consisting essentially of in an aqueous solution,
    a soluble basic material having a pH in the range of 8.2 to 12.4 from a saturated solution of a slightly soluble base up to 35% by weight of a soluble base, and
    a volatile basic material in combination therewith.
2. A deodorant composition consisting essentially of a water soluble basic salt having a pH in the range of from 8.2 to 12.4 from a saturated solution of a slightly soluble basic salt up to 35% by weight of a soluble basic salt,
    a volatile base, and
    a wetting agent.
3. A deodorant composition consisting essentially of, a water soluble basic salt having a pH in the range of from 8.2 to 12.4 from a saturated solution of a slightly soluble basic salt up to 35% by weight of a soluble basic salt,
  a volatile base, and
  bactericidal agent.

4. A deodorant composition consisting essentially of,
  a water soluble basic salt having a pH in the range of 8.2 to 12.4 from a saturated solution of a slightly soluble basic salt up to 35% by weight of a soluble basic salt,
  a volatile base, and
  a fungicidal agent.

5. The composition of claim 2 and including a bactericidal agent.

6. The composition of claim 2 and including a fungicidal agent.

7. A deodorant composition consisting essentially of,
  and aqueous soluble basic salt having a pH in the range of 8.2 to 12.4 from a saturated solution of a slightly soluble basic salt to 35% by weight of a soluble basic salt,
  a volatile base,
  a wetting agent,
  a bacteriological agent, and
  a fungicidal agent.

8. A deodorant composition consisting essentially of a water solution of from, a saturated solution of a slightly soluble base to thirty-five percent by weight of a soluble basic material comprising:
  a water soluble basic compound selected from the group consisting of sodium bicarbonate, potassium bicarbonate, sodium carbonate, di-sodium phosphate, sodium acetate, sodium citrate, sodium tartrate, sodium borate, calcium borate, potassium borate, calcium hydroxide, and magnesium hydroxide, and mixtures thereof, and
  from 0.1 to ten percent of a voilatile base selected from the group consisting of ammonia, volatile amines, quaternary ammonium hydroxide from which volatile basic products may be evolved, and mixtures thereof.

9. The composition of claim 7 and including up to two percent of a wetting agent selected from the group consisting of silicones, alkylaryl sulfonates, alkyl sulfates, esters of polymeric alcohols with fatty acids, monoesters of polyhydric alcohols, and esters of polymeric ether alcohols.

10. The composition of claim 7 wherein the concentration of the bactericidal agent is substantially 1% by weight.

11. The composition of claim 7 wherein the concentration of the fungicidal agent is substantially 1% by weight.

12. The method of deodorizing vomitus containing low molecular weight odoriferous fatty acids, comprising treating the vomitus with an aqueous solution of a non-volatile water soluble base and water soluble basic salt having a pH in the range of from 8.2 to 12.4 from a saturated solution of a slightly soluble base to 35% by weight of a soluble base, in order to convert the low molecular weight odoriferous fatty acids to odorless salt.

13. The method of claim 12 and in which the solution comprises additionally a volatile base.

References Cited by the Examiner

UNITED STATES PATENTS

| | | | |
|---|---|---|---|
| 651,536 | 6/1900 | Stern | 252—137 |
| 1,210,918 | 2/1917 | Eigelberner | 99—120 |
| 1,336,272 | 4/1920 | Billing | 167—14 |
| 1,919,502 | 7/1933 | Davis | 99—119 |
| 2,727,007 | 12/1955 | Little et al. | 252—137 |
| 2,801,978 | 8/1957 | Perlman | 252—137 |
| 3,102,101 | 8/1963 | Hawley et al. | 167—90 |

ALBERT T. MEYERS, *Primary Examiner.*

GEORGE A. MENTIS, *Assistant Examiner.*